(12) United States Patent
Shih

(10) Patent No.: US 10,443,193 B2
(45) Date of Patent: Oct. 15, 2019

(54) EMULATED WOOD WITH PORES AND FIBERS AND FABRICATION METHOD THEREOF

(71) Applicant: MICROCELL COMPOSITE COMPANY, Tainan (TW)

(72) Inventor: Ruey-Sheng Shih, Tainan (TW)

(73) Assignee: MICROCELL COMPOSITE COMPANY, Tainan (TW)

( * ) Notice: Subject to any disclaimer, the term of this patent is extended or adjusted under 35 U.S.C. 154(b) by 1264 days.

(21) Appl. No.: 14/490,316

(22) Filed: Sep. 18, 2014

(65) Prior Publication Data

US 2015/0376840 A1 Dec. 31, 2015

(30) Foreign Application Priority Data

Jun. 25, 2014 (TW) .............................. 103121900 A

(51) Int. Cl.
*B32B 5/32* (2006.01)
*B32B 27/08* (2006.01)
*B32B 27/26* (2006.01)
*B32B 3/08* (2006.01)
*D21H 27/06* (2006.01)
(Continued)

(52) U.S. Cl.
CPC ......... *D21H 27/06* (2013.01); *B29C 44/1266* (2013.01); *B29C 70/026* (2013.01); *B32B 3/08* (2013.01); *B32B 5/32* (2013.01); *B32B 27/08* (2013.01); *B32B 27/26* (2013.01); *B32B 37/185* (2013.01); *D21H 21/22* (2013.01); *D21H 21/56* (2013.01); *B32B 2038/0084* (2013.01); *B32B 2266/02* (2013.01); *B32B 2266/0228* (2013.01); *B32B 2266/0292* (2013.01);
(Continued)

(58) Field of Classification Search
CPC ........ D21H 27/06; D21H 21/56; D21H 21/22; B29C 44/1266; B29C 70/026; B32B 3/08; B32B 27/26; B32B 27/08; B32B 37/185; B32B 2266/0292; B32B 2266/0228; B32B 2266/08; B32B 2266/104; B32B 5/12; B32B 5/22–32; B32B 5/245; B32B 2274/00; B32B 27/302; B32B 27/065; B32B 27/04
USPC .......... 428/292.1, 295.4, 294.1, 298.1, 304.4
See application file for complete search history.

(56) References Cited

U.S. PATENT DOCUMENTS

2006/0213600 A1* 9/2006 Wu ..................... B29C 44/0461
156/79
2009/0286893 A1* 11/2009 Shih ......................... B32B 5/18
521/54
2016/0250784 A1* 9/2016 De Groot ................ B29C 44/10
264/46.3

* cited by examiner

Primary Examiner — Jenna L Johnson
(74) Attorney, Agent, or Firm — Bacon & Thomas, PLLC

(57) ABSTRACT

A method for fabricating emulated wood with pores and fibers, comprising: immersing a plurality of synthetic fibers configured parallel in a plane into a resin so that the resin is coated on the surfaces of the plurality of synthetic fibers and in the gaps between the plurality of synthetic fibers; placing the plurality of synthetic fibers between two sheets, wherein the two sheets are planar sheets made from a uniform composition comprising a thermoplastic elastomer, a foaming agent, and a crosslinking agent; carrying out a heat-press process on the two sheets so that the foaming agent undergoes microcellular foaming and forms dense closed pores in the two sheets, and so that the composition on inner surfaces of the two sheets expands towards the plurality of synthetic fibers and penetrates through the gaps between the plurality of synthetic fibers; and cooling the two sheets to yield an emulated wood board.

13 Claims, 6 Drawing Sheets

(51) Int. Cl.
  *B29C 70/02* (2006.01)
  *B32B 37/18* (2006.01)
  *D21H 21/22* (2006.01)
  *D21H 21/56* (2006.01)
  *B29C 44/12* (2006.01)
  *B32B 38/00* (2006.01)
(52) U.S. Cl.
  CPC ..... *B32B 2266/08* (2013.01); *B32B 2266/104* (2016.11); *B32B 2274/00* (2013.01)

EMULATED WOOD WITH PORES AND FIBERS AND FABRICATION METHOD THEREOF

FIELD OF THE INVENTION

The invention relates to an emulated wood, and more particularly to an emulated wood with pores and fibers fabricated by foaming thermoplastic elastomers so that the emulated wood has not only wood characteristics (non-toxicity, recyclability, good dyeability, weather resistance, etc.) and wood grain of genuine wood, but also plasticity and fiber strength superior to those of genuine wood.

BACKGROUND OF THE INVENTION

Among the variety of natural resources, the forest resource is an extremely significant resource of the Earth; in addition to producing diverse animal and plant ecology, the forest has also provided all kinds of resources required by humans and is closely related to our daily life. Therefore, the enhancement of the utilization rate, recovering rate, and recycling rate of wood has been a crucial topic requiring breakthroughs to be made for countries over the world, so as to reduce the unnecessary wasting of natural resources and effectively reduce the manpower and material resources required for processing scrap. In view of this, researches in wood-plastic composite (WPC) prepared using wood scraps or particles have received more and more attention in the world owing to the dimensional stability and insect resistance of WPC being superior to genuine wood in addition to the effective utilization of wood fiber scraps to fabricate WPC; therefore, WPC may be used for up to 25-30 years without particular maintenance. At present, the application of WPC is mainly in materials for transportation and non-structural and semi-structural architectures; for the example of United States, there are more than thirty WPC outdoor decking manufacturers and the market share of WPC outdoor decking has reached about 25%. Such indicates wider and popular utilizations and applications of WPC in the future.

Generally speaking, composite materials combine two or more raw materials with different characteristics by different processes to utilize the characteristics and advantages of each of the raw materials, and produce new materials having superior characteristics and satisfying requirements by synergistic effects. Among various composite materials, fiber-reinforced composite materials have superior characteristics and wider applications. The composite material is known as a wood-based composite when one of the raw materials is wood, and the fabrication of which mainly uses wood scraps or particles of different sizes to mix with adhesives and bond into boards under high temperature and high pressure. Conventional wood-based composites commonly use formaldehyde-based adhesives and issues of free formaldehyde often occur during usage; such wood-based composites also often expand and disperse when soaked into water. To solve such issues, wood-plastic composites (WPC) have been produced by mixing wood with plastic raw materials to reduce the release of free formaldehyde and improve the dimensional stability issues. In addition, since WPC combines the characteristics of wood and plastic, the shortcomings of each of the two raw materials may be overcome; for instance, plastic has the disadvantages of high specific weight, poor antistatic properties, and poor elasticity, yet the addition of wood reduces the specific weight and enhances antistatic properties and elasticity; on the other hand, for the wood raw material, the addition of plastic improves the dimensional stability, insect resistance, decay resistance, and weather resistance of the wood. Furthermore, when the percentage of added wood fiber increases, the structural strength or modulus of elasticity (MOE) of the material also increases.

Conventional WPC are fabricated by mixing wood flour or pulp materials with typical thermoplastics such as polyethylene, polypropylene, polyvinyl chloride, or polystyrene and form wood-fiber-plastic composite materials (or wood-flour-plastic composite materials) under high temperature. At present, approximately 70% of WPC uses polyethylene as the plastic matrix while lesser parts use polypropylene and polyvinyl chloride as the plastic matrix. In addition, to enhance the strength and ductility of thermoplastic products and reduce production cost, fibers and fillings are often added to the plastic as intensifiers; most of the early plastic industries (about 93%) use synthetic fibers for the fibers, while recycled wood fibers have become more common in the recent years. The oil crisis in the 1970s has also encouraged the usage of biomass fibers in the industry.

In summary, WPC substitutes the inorganic fiber materials or fillings in conventional plastics with wood fibers, and when the wood fibers are mixed with thermoplastics to yield composite materials, not only the physical characteristics and mechanical properties of wood materials are effectively improved but also the processability is enhanced. Therefore, WPC has largely replaced conventional metal, plastic, and solid wood materials in recent years and is commonly applied in products of decking, fences, outer panels, frames, and roofs. However, several issues exist when wood fiber (or wood flour) is used as an intensifier or filling for plastics, and the main issue among which is that the difference between the surface polarities of plastics and wood fibers hinders the chemical bonding between the two; furthermore, wood fibers suffer from poor dispersion in plastics due to hydrogen bonds between the fibers.

To solve the compatibility issue of plastic and fibers, coupling agents or adhesion-promoting agents such as maleated polyethylene (MAPE), maleic anhydride grafted polypropylene (MAgPP), and oxidized LDPE may be used to overcome this issue; however, to solve the poor dispersion issue of fibers requires adding dispersing agents such as stearic acid, paraffin wax, or mineral oil to achieve improvements. In addition, grafting may be utilized to form copolymers of monomers (e.g., 1-phenylthene, 4-methyl-2-oxy-3-oxopent-4-ene, etc.) and wood fibers to solve the issues of fiber polarity and dispersion. Chemical modification is also used in recent years to improve the interface properties of WPC. Generally speaking, although chemical modification may reduce the surface polarity of WPC and enhance the compatibility of wood and plastic, it requires using many chemicals, where the most basic chemical modification uses modifiers with a single functional group; modifiers with double functional groups or multiple functional groups may also be used. Among various chemical modification methods, the most appreciated and practical one is the method of reacting acetic anhydride with hydroxyl groups of the wood, i.e., acetylation; however, when carrying out acetylation reactions by acetic anhydride, longer reaction times are required to obtain superior weight percentage gain (WPG) or degree of substitution when under environments without solvents and catalysts; therefore, solvents such as dimethylformamide (DMF), dimethyl sulfoxide (DMSO) or pyridine are commonly used when carrying out acetylation reactions by acetic anhydride to enhance the reaction rate with acetic anhydride so that superior acetylation results may be achieved in shorter reaction times. However, the addition of solvents inevitably increases cost and toxicity resulting from the solvent, while the reaction time still takes several hours to achieve a superior acetylation result.

The rising environmental consciousness in recent years has impeded the popular usage or application of the aforementioned WPC or other plastic composites in our daily needs due to the various structural disadvantages and toxicity issues described in above. Thusly, the development of an emulated wood with high elasticity and strength, non-toxicity, recyclability, good dyeability, weather resistance, etc. and further emulating the wood characteristics and wood grain of genuine wood and having plasticity and fiber strength superior to those of genuine wood has been a crucial topic to be solved for manufacturers over the world.

BRIEF SUMMARY OF THE INVENTION

An aspect of the invention provides an emulated wood with pores and fibers and a fabrication thereof, the fabrication method comprising: immersing a plurality of synthetic fibers (such as glass fibers or carbon fibers) configured parallel in a plane into a resin so that the resin is coated on the surfaces of the plurality of synthetic fibers and in the gaps between the plurality of synthetic fibers; placing the plurality of synthetic fibers between two sheets so that the plurality of synthetic fibers and the two sheets are attached to each other, wherein the two sheets are planar sheets made from a uniform composition comprising a thermoplastic elastomer (TPE), a foaming agent, and a crosslinking agent; carrying out a heat-press process on outer surfaces of the two sheets so that the foaming agent in the two sheets undergoes microcellular foaming after being heated and forms dense closed pores in the two sheets, and so that the composition on inner surfaces of the two sheets expands towards the plurality of synthetic fibers and penetrates through the gaps between the plurality of synthetic fibers to be intertwined by pressure from microcellular foaming of itself and surroundings; and cooling the two sheets to yield an emulated wood board, wherein the inner surfaces of the two sheets after microcellular foaming form irregular contact surfaces with the plurality of synthetic fibers and are densely and firmly combined in one by adherence force of the resin. Since the two sheets not only have high elasticity and strength of rubber but also have advantages of non-toxicity, recyclability, good dyeability, weather resistance, etc., the two sheets may emulate the wood characteristics and wood grain of genuine wood after dyeing and foaming and forming dense closed pores within. In addition, since the inner surfaces of the two sheets after microcellular foaming form irregular contact surfaces with the plurality of synthetic fibers and are densely and firmly combined in one, the resulting emulated wood board has plasticity and fiber strength superior to those of genuine wood boards.

Another aspect of the invention provides steps of a rolling process after the step of yielding an emulated wood board to yield an emulated wood column, wherein the steps of the rolling process comprise: heating the emulated wood board; rolling, with the plurality of synthetic fibers as axes, the emulated wood board densely to attach the outer surface of an inner sheet of the two sheets to the outer surface of an outer sheet of the two sheets so that the outer surface of the inner sheet and the outer surface of the outer sheet are fused in one after the two sheets are heated to soften and the outer surfaces of the two sheets are melted; and cooling the inner sheet and the outer sheet to yield an emulated wood column. Since the plurality of synthetic fibers are along the axis of the emulated wood column and is equidistantly or helically distributed radially, the emulated wood column has fiber strength far more superior to that of genuine wood columns and may be easily molded into columns with different cross-section shapes.

Another aspect of the invention provides that the composition of the two sheets comprises the thermoplastic elastomer with a weight percentage of 10-80%, the cross-linking agent with a weight percentage of 0.01-2.0%, and the foaming agent with a weight percentage of 0.1-15.0%, wherein the types and proportions of the thermoplastic elastomer may be adjusted to prepare emulated wood with different properties such as hardness or density.

Another aspect of the invention provides that the thermoplastic elastomer at least comprises two thermoplastic elastomers with different characteristics (i.e., a first thermoplastic elastomer and a second thermoplastic elastomer), wherein the first thermoplastic elastomer is a polymer group of one or any mixture of styrene-butadiene-styrene block copolymer (SBS), styrene-isoprene-styrene block copolymer (SIS), and styrenic block copolymer (SBC) with a weight percentage of 10-80% as a matrix for a soft-segment structure of the two sheets, and wherein the second thermoplastic elastomer is a polymer group of one or any mixture of polystyrene (PS), acrylonitrile-styrene copolymer (AS), acrylonitrile-butadiene-styrene (ABS), and high-impact polystyrene (HIPS) with a weight percentage of 10-80% as a matrix for a hard-segment structure of the two sheets. Therefore, the weight percentage of the first thermoplastic elastomer or the second thermoplastic elastomer may be adjusted according to actual needs to adjust the material characteristics of the soft-segment structure and the hard-segment structure of the two sheets so as to emulate the different soft and hard wood characteristics of various genuine woods.

Another aspect of the invention provides that the two sheets are fabricated by heating the composition at a temperature above 100° C. to be softened and melted and mixed into a molten, wherein the molten is subsequently kneaded at a temperature range of 110-130° C. to uniformly mix the composition, wherein the molten is subsequently sheeted by a calendar machine to yield the two sheets, and wherein the thickness of the two sheets is between 0.5 and 1.0 mm.

Another aspect of the invention provides that the temperature of the heat-press process is in the range of 160-180° C. and the pressure of the heat-press process is in the range of 250-300 $kg/cm^2$.

DETAILED DESCRIPTION OF THE INVENTION

The purposes, processes, structure features, and effects of the invention may be more fully understood by the subsequent detailed description and examples with references made to the accompanying drawings.

Commercial thermoplastic elastomers (TPE) are polymers having the characteristics of high elasticity and high strength of rubber, and not only do they have the processability of thermoplastics but they also have the physical properties of vulcanized rubber, and thus is a combination of the advantages of plastic and rubber; in addition, the characteristics of superior ultraviolet-resistance, weather resistance, and high-temperature resistance renders it suitable for long-term outdoor applications. Therefore, the applications of TPE have gradually replaced those originally of vulcanized rubber. Furthermore, since the fabrication process of TPE usually requires no or short times of vulcanization, energy may be effectively saved and the generated waste (such as flash or residue) and final rejected products may all be recycled and reused, and even the used TPE products may be recycled after simple regeneration processes. In short, TPE further has outstanding characteristics of reducing environmental pollution and facilitating resource regeneration.

Among the various commercial TPE materials, styrenic thermoplastic elastomer has properties most close to those of styrene-butadiene rubber (SBR), which is a styrene block copolymer (TPS) of butadiene or isoprene and styrene. The present annual yield of TPS takes up about half of that of all TPE, and owing to their advantages of material characteristics stability, non-toxicity, 100% recyclability, and low cost, TPS has been widely used in shoe making to replace most rubbers and has increasing applications in industrial rubber products such as rubber fabric and rubber plates. It is now further used as water-proof membranes for water proofing and moisture proofing in building roofs, subways, tunnels, trenches, etc. Therefore, the outstanding characteristics of styrenic thermoplastic elastomer in above are utilized to produce an emulated wood with pores and fibers of the invention after long-term studies so as to fabricate the emulated wood under prerequisites of high availability and low cost, so that the emulated wood not only has advantages of high elasticity and strength, non-toxicity, recyclability, good dyeability, weather resistance, etc. but also emulates the wood characteristics and wood grain of genuine wood and has plasticity and fiber strength superior to those of genuine wood.

Figure 1:
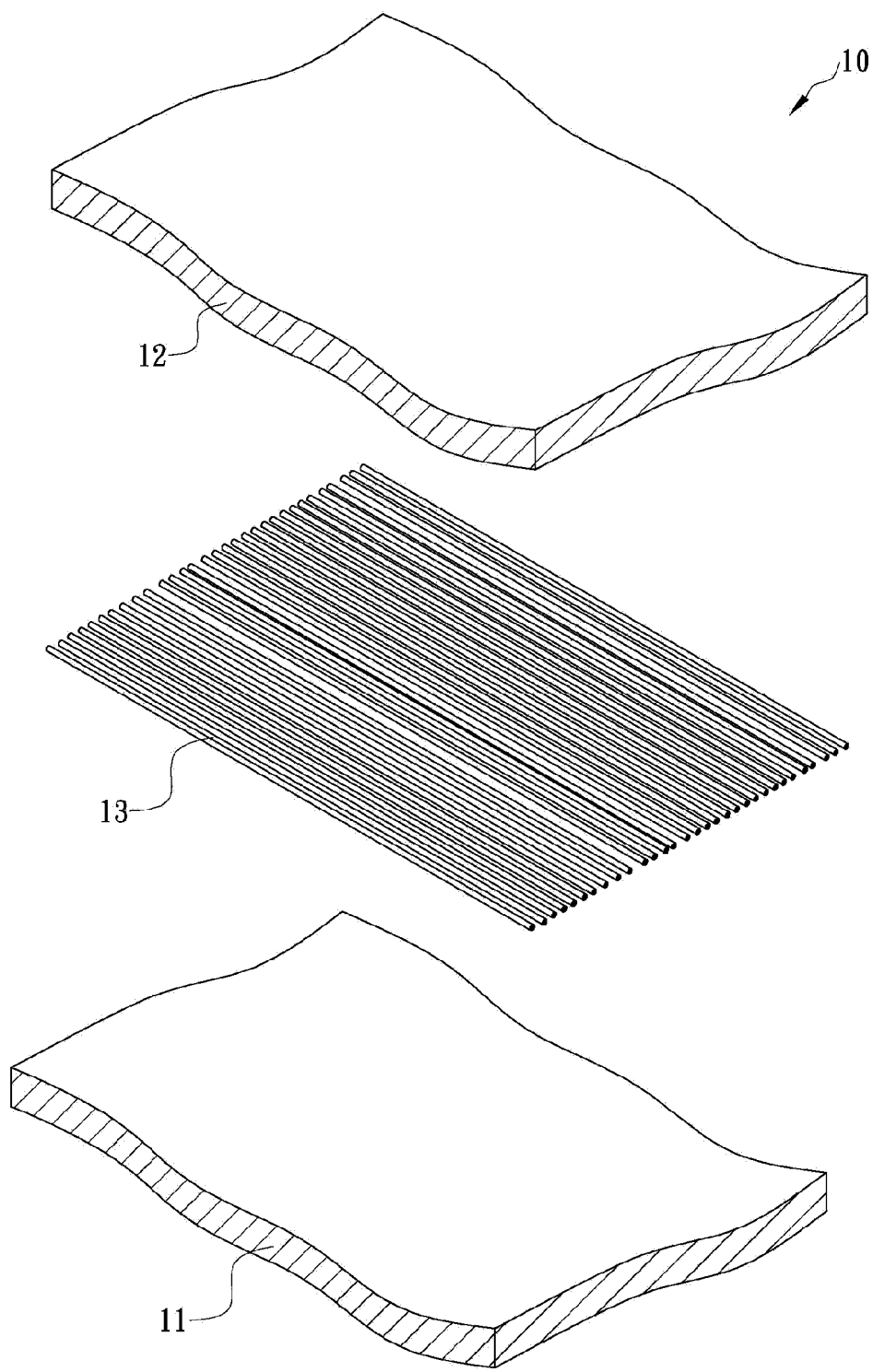
FIG. 1 is an exploded view of the structure of an emulated wood of the invention.

The invention provides an emulated wood with pores and fibers, the fabrication method of which mainly uses a styrenic thermoplastic elastomer for foaming to emulate the wood characteristics and wood grain of genuine wood and uses synthetic fibers to emulate plasticity and fiber strength superior to those of genuine wood. As shown in FIG. 1, an emulated wood board 10 of the invention comprises at least two sheets 11 and 12 and a plurality of synthetic fibers 13 (such as glass fibers or carbon fibers), wherein the sheets 11 and 12 are made from a composition comprising a thermoplastic elastomer, a foaming agent, and a crosslinking agent, wherein the sheets 11 and 12 are fabricated by heating the composition at a temperature above 100° C. to be softened and melted and mixed into a molten, wherein the molten is subsequently kneaded at a temperature range of 110-130° C. to uniformly mix the composition, wherein the molten is subsequently sheeted by a calendar machine to yield the sheets 11 and 12, and wherein the thickness of the sheets 11 and 12 is between 0.5 and 1.0 millimeters (mm).

In a preferred embodiment of the invention, to emulate the different soft and hard wood characteristics of various genuine woods according to actual requirements, the thermoplastic elastomer at least comprises two thermoplastic elastomers with different characteristics (i.e., a first thermoplastic elastomer and a second thermoplastic elastomer), wherein the first thermoplastic elastomer is a polymer group of one or any mixture of styrene-butadiene-styrene block copolymer (SBS), styrene-isoprene-styrene block copolymer (SIS), and styrenic block copolymer (SBC) with a weight percentage of 10-80% as a matrix for a soft-segment structure of the two sheets, and wherein the second thermoplastic elastomer is a polymer group of one or any mixture of polystyrene (PS), acrylonitrile-styrene copolymer (AS), acrylonitrile-butadiene-styrene (ABS), and high-impact polystyrene (HIPS) with a weight percentage of 10-80% as a matrix for a hard-segment structure of the two sheets. Therefore, the weight percentage of the first thermoplastic elastomer or the second thermoplastic elastomer may be adjusted according to actual needs to adjust the material characteristics of the soft-segment structure and the hard-segment structure of the sheets 11 and 12 so as to emulate the different soft and hard wood characteristics of various genuine woods.

Figure 2:
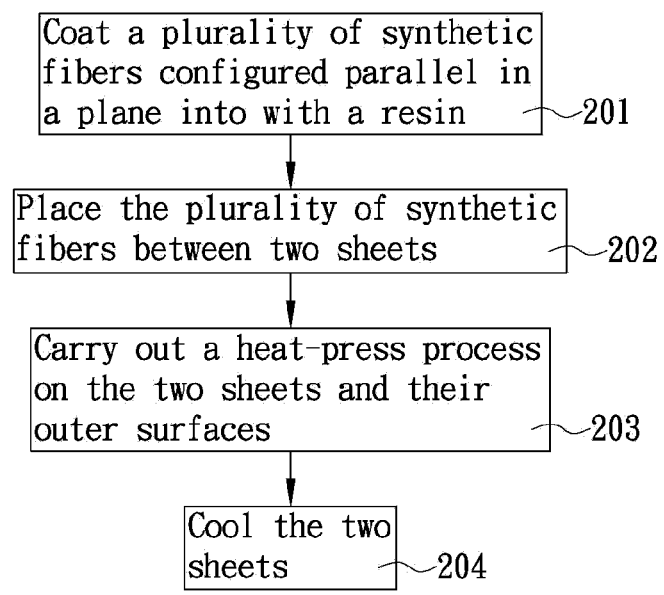
FIG. 2 is a flow chart of a fabrication method of the emulated wood of the invention.
Figure 3:
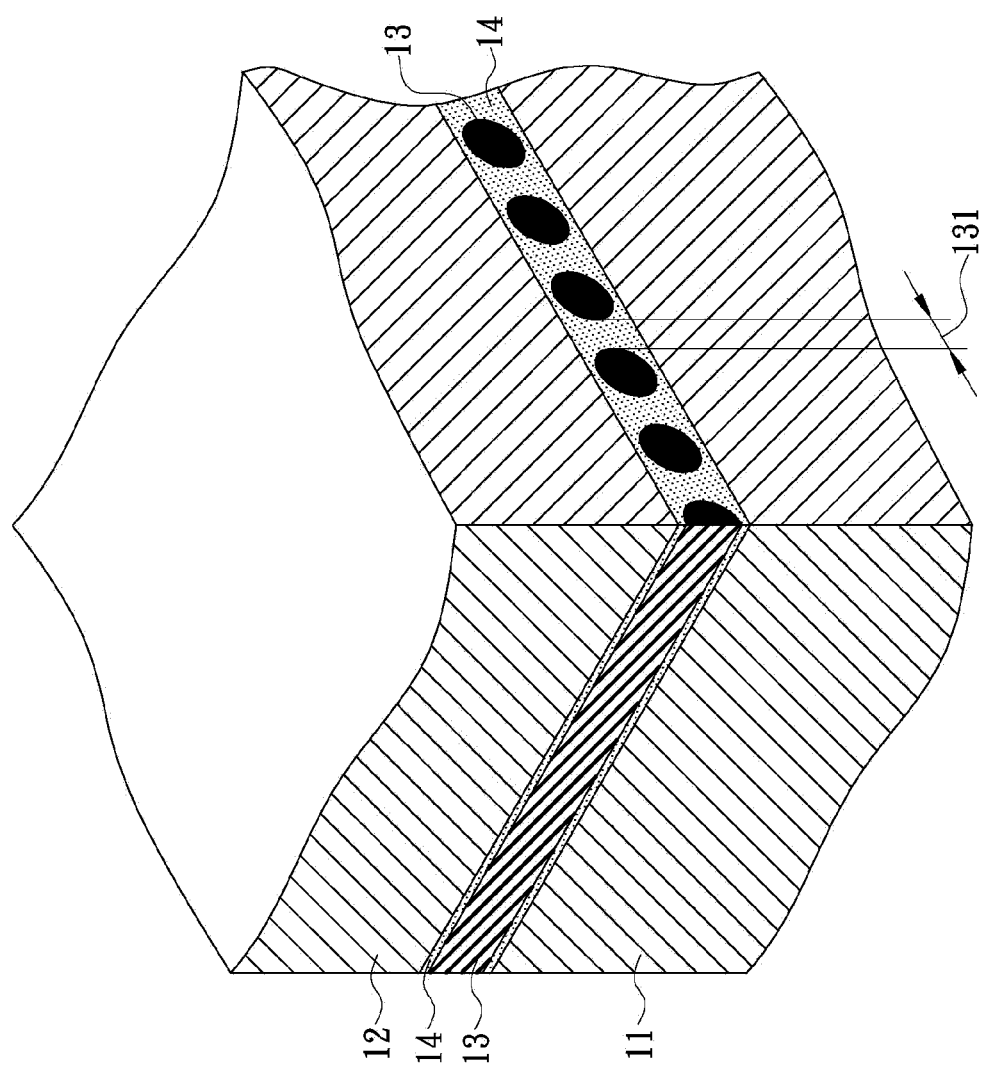
FIG. 3 is a detailed cross-section view of an emulated wood board of the invention before completion.
Figure 4:
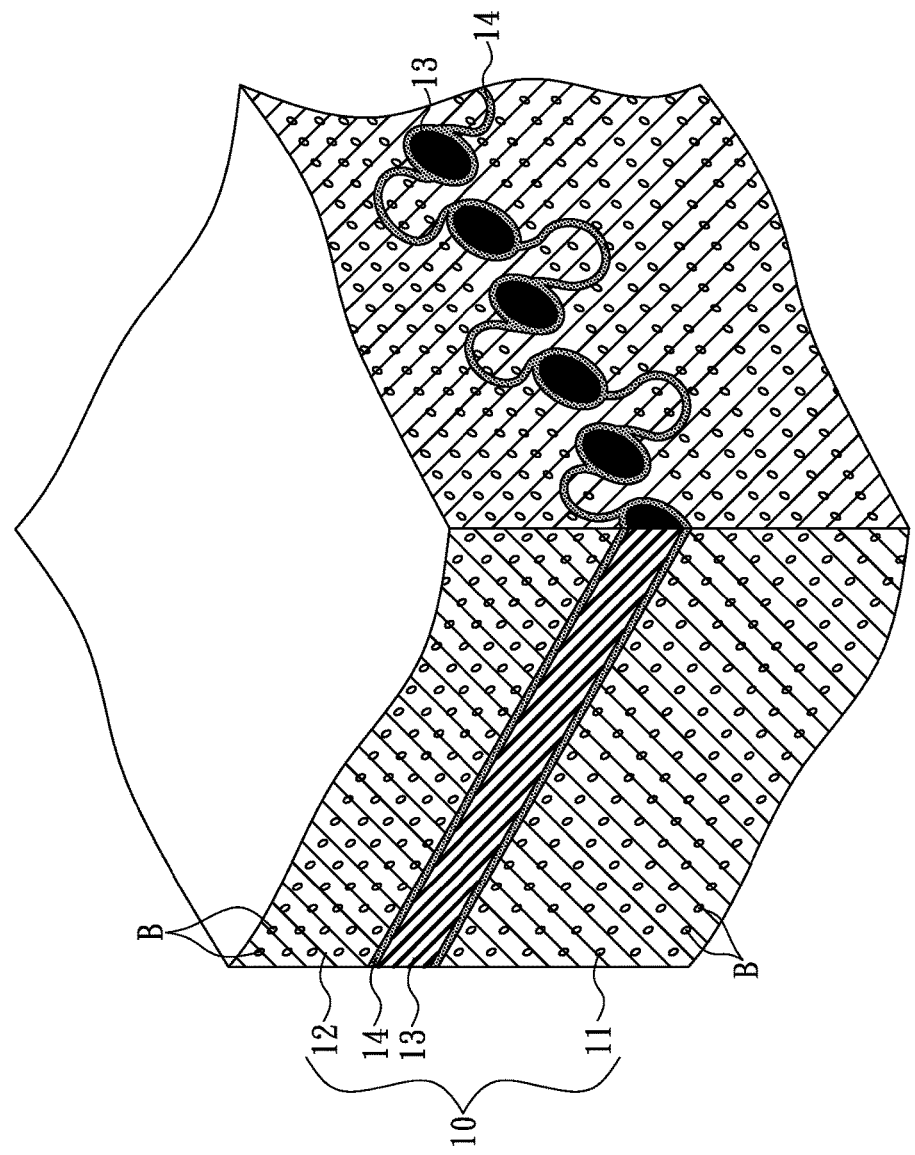
FIG. 4 is a detailed cross-section view of the emulated wood board of the invention after completion.

The foaming agent in the invention may be selected from an azo-based chemical foaming agent or a baking soda physical foaming agent with a weight percentage of 0.1-15.0%, and the crosslinking agent may be selected from dicumyl peroxide, 2,5-(tert-butylperoxide)-2,5-dimethylhexane, or sulfur with a weight percentage of 0.01-2.0%. As shown in FIG. 2, the fabrication method of the emulated wood board 10 comprises the following steps:

Step 201: immersing a plurality of synthetic fibers 13 (such as glass fibers or carbon fibers) configured parallel in a plane into a resin 14 so that the resin 14 is coated on the surfaces of the plurality of synthetic fibers 13 and in the gaps 131 between the plurality of synthetic fibers 13;

Step 202: as shown in FIG. 3, placing the plurality of synthetic fibers 13 between the sheets 11 and 12 so that the plurality of synthetic fibers 13 and the sheets 11 and 12 are attached to each other;

Step 203: carrying out a heat-press process by a heat-press machine on the sheets 11 and 12 and their outer surfaces, wherein the temperature and the pressure of the heat-press process may be set according to the material and thickness of the sheets 11 and 12, wherein the temperature of the heat-press process may be adjusted to be in the range of 160-180° C. and the pressure of the heat-press process may be adjusted to be in the range of 250-300 kilograms per square centimeter ($kg/cm^2$), so that the foaming agent in the sheets 11 and 12 undergoes microcellular foaming after being heated and forms dense closed pores B in the sheets 11 and 12, and so that the composition on inner surfaces of the sheets 11 and 12 expands towards the plurality of synthetic fibers 13 and penetrates through the gaps 131 between the plurality of synthetic fibers 13 to be intertwined by pressure from microcellular foaming of itself and surroundings as shown in FIG. 4; and Step 204: cooling the sheets 11 and 12.

Therefore, as shown in FIG. 4, the inner surfaces of the sheets 11 and 12 after microcellular foaming form irregular contact surfaces with the plurality of synthetic fibers 13 and are densely and firmly combined in one by adherence force of the resin 14 to yield the emulated wood board 10, which not only emulates the wood characteristics and wood grain of genuine wood but also has plasticity and fiber strength superior to those of genuine wood.

Figure 5:
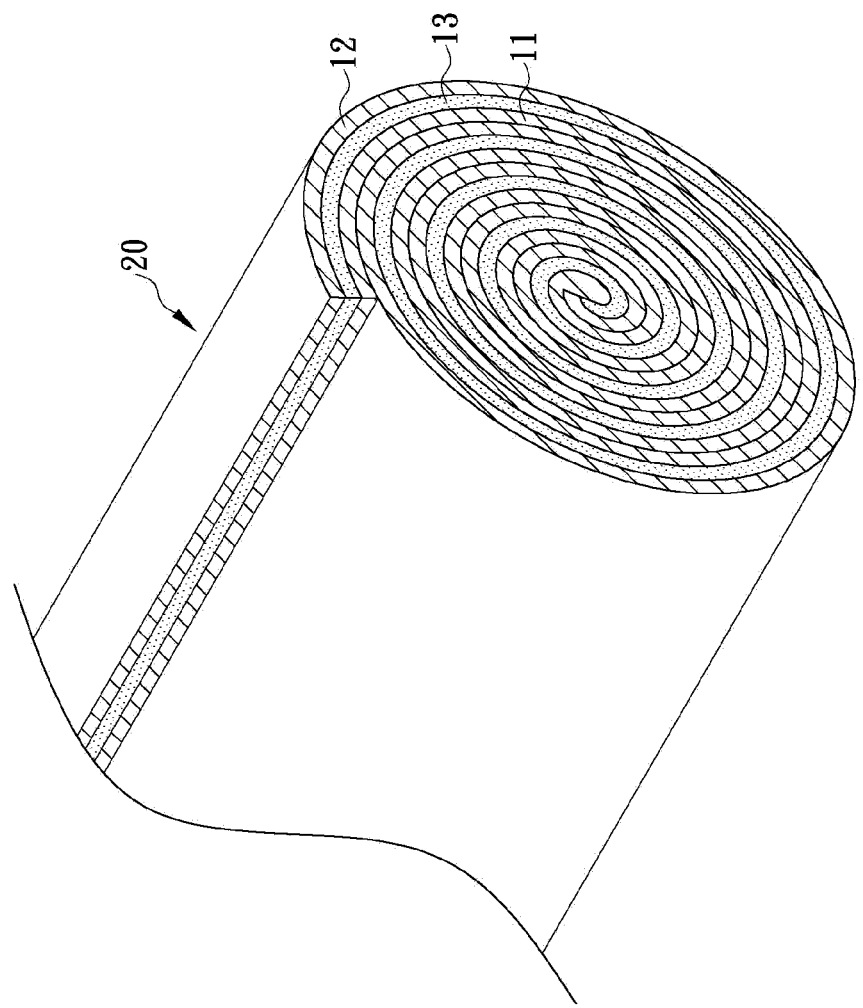
FIG. 5 is a schematic of a finished emulated wood column of the invention.
Figure 6:
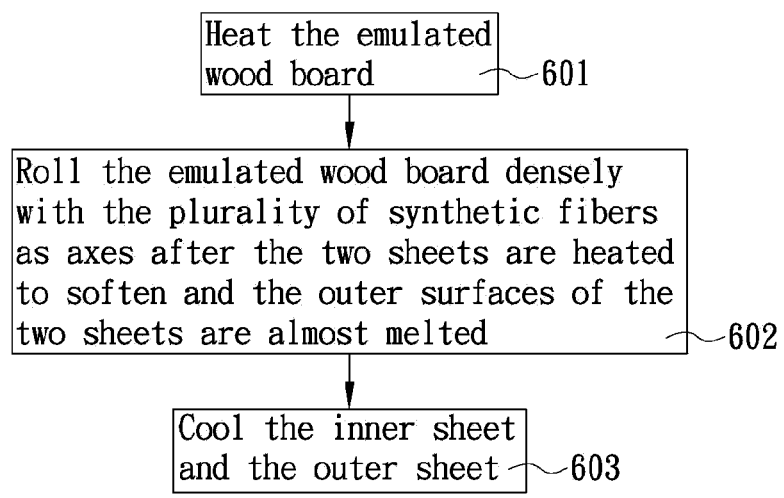
FIG. 6 is a flow chart of a fabrication method of the emulated wood column of the invention.

In another preferred embodiment of the invention, steps of a rolling process may be carried out on the emulated wood board 10 after yielding the emulated wood board 10 to yield an emulated wood column 20 in FIG. 5, wherein the steps of the rolling process are shown in FIG. 6 and comprise:

Step 601: heating the emulated wood board 10;

Step 602: rolling, with the plurality of synthetic fibers 13 as axes, the emulated wood board 10 densely to attach the outer surface of an inner sheet 11 to the outer surface of an outer sheet 12 so that the outer surface of the inner sheet 11 and the outer surface of the outer sheet 12 are fused in one after the sheets 11 and 12 are heated to soften and the outer surfaces of the sheets 11 and 12 are almost melted; and Step 603: cooling the inner sheet 11 and the outer sheet 12 to yield the emulated wood column 20.

Therefore, after completing the rolling process and cooling, since the plurality of synthetic fibers 13 are along the axis of the emulated wood column 20 and is equidistantly or helically distributed radially and the outer surface of the inner sheet 11 and the outer surface of the outer sheet 12 are fused in one, the emulated wood column 20 has fiber strength far more superior to those of genuine wood columns and may be easily molded into columns with different cross-section shapes.

In other embodiments of the invention, foaming promoters, dyes, or fire retardants may be added during the fabrication process of the sheets 11 and 12 according to actual needs to enhance and promote the properties and performances of the emulated woods 10 and 20 comprising the sheets 11 and 12; the foaming promoter may have a weight percentage of 0.1-10.0%, the dye may be used to adjust the wood color and wood grain of the emulated woods 10 and 20, and the fire retardant may be used to enhance the fire-retarding ability of the emulated woods 10 and 20.

In summary, the emulated woods 10 and 20 fabricated according to the invention may have not only wood colors adjusted to be very close to those of genuine wood but also cross sections with wood grains with patterns like annual rings; in addition, it has been discovered by various physical-property tests of the invention that the hardness and substance of the emulated woods 10 and 20 are very close to those of teak wood, yet their weight is lighter than that of teak wood and they may undertake heavier weights. Furthermore, it has also been discovered by various physical-property tests and comparisons of the emulated woods 10 and 20 and genuine wood or other WPC materials that the emulated woods 10 and 20 of the invention have superior nonabsorbent properties and are suitable for manufacturing general outdoor products such as benches or fences, furniture or decorations, toys or blocks, landscapes or woodworking, stationary, models, etc., and have far more longer lifespans and superior strengths than common genuine wood or other WPC materials when used under high-temperature or humid outdoor environments for long terms. Moreover, since the emulated woods 10 and 20 of the invention use the aforementioned polymer materials as matrices and no other toxic solvent or chemical is added during the entire fabrication process, the emulated woods 10 and 20 may be completely recycled and reused after simple processing as like general polymer materials after being discarded when no longer usable; therefore, not only the troublesome processing of disposals and unnecessary wasting of storage spaces may be effectively avoided, the ultimate purpose of energy conservation and carbon reduction and environment resource protection may also be easily achieved.

While the invention herein disclosed has been described by means of specific embodiments, numerous modifications and variations could be made thereto by those skilled in the art without departing from the scope of the invention set forth in the claims.

What is claimed is:

1. An emulated wood with pores and fibers, wherein the emulated wood includes two sheets (11, 12) and a plurality of synthetic fibers (13), the two sheets (11, 12) are planar sheets made from a uniform composition comprising a thermoplastic elastomer, a foaming agent and a crosslinking agent, and the plurality of synthetic fibers (13) are attached between the two sheets (11, 12), respectively, and the emulated wood is characterized in that:

the plurality of synthetic fibers (13) are configured parallel in a plane, a resin is coated on the surfaces of the plurality of synthetic fibers (13) and in the gaps (131) between the plurality of synthetic fibers (13), and the two sheets (11, 12) are rolled with the plurality of synthetic fibers (13) as axes to attach an inner surface of an inner sheet (11) of the two sheets (11, 12) to an outer surface of an outer sheet (12) of the two sheets (11, 12) so that the inner surface of the inner sheet (11) and the outer surface of the outer sheet (12) are fused in one to yield the emulated wood;

wherein after a heat-press process is carried out on the two sheets (11, 12), the foaming agent in the two sheets (11, 12) undergoes microcellular foaming and forms dense closed pores (B) in the two sheets (11, 12) so that, due to heat pressing on the two sheets (11, 12) and microcellular foaming, the composition on inner surfaces of the two sheets (11, 12) expands towards the plurality of synthetic fibers (13) and penetrates through the gaps (131) between the plurality of synthetic fibers to be intertwined by pressure from microcellular foaming of itself and surroundings, and the inner surfaces of the two sheets (11, 12) form irregular contact surfaces with the plurality of synthetic fibers (13) and are densely and firmly combined in one by adherence force of the resin (14) to yield the emulated wood.

2. The emulated wood as claimed in claim 1, wherein the thickness of the two sheets (11, 12) is between 0.5 and 1.0 mm.

3. The emulated wood as claimed in claim 2, wherein the thermoplastic elastomer is styrenic thermoplastic elastomer.

4. The emulated wood as claimed in claim 1, wherein the thermoplastic elastomer is styrenic thermoplastic elastomer.

5. The emulated wood as claimed in claim 3, wherein the thermoplastic elastomer at least comprises a first thermoplastic elastomer and a second thermoplastic elastomer, wherein the first thermoplastic elastomer and the second thermoplastic elastomer are two thermoplastic elastomers with different characteristics, and wherein the first thermoplastic elastomer is a matrix for a soft-segment structure of the two sheets (11, 12) and the second thermoplastic elastomer is a matrix for a hard-segment structure of the two sheets (11, 12).

6. The emulated wood as claimed in claim 4, wherein the thermoplastic elastomer at least comprises a first thermoplastic elastomer and a second thermoplastic elastomer, wherein the first thermoplastic elastomer and the second thermoplastic elastomer are two thermoplastic elastomers with different characteristics, and wherein the first thermoplastic elastomer is a matrix for a soft-segment structure of the two sheets (11, 12) and the second thermoplastic elastomer is a matrix for a hard-segment structure of the two sheets (11, 12).

7. The emulated wood as claimed in claim 5, wherein the first thermoplastic elastomer is a polymer group of one or any mixture of styrene-butadiene-styrene block copolymer (SBS), styrene-isoprene-styrene block copolymer (SIS), and styrenic block copolymer (SBC) with a weight percentage of 10-80%, and wherein the second thermoplastic elastomer is a polymer group of one or any mixture of polystyrene (PS), acrylonitrile-styrene copolymer (AS), acrylonitrile-butadiene-styrene (ABS), and high-impact polystyrene (HIPS) with a weight percentage of 10-80%.

8. The emulated wood as claimed in claim 6, wherein the first thermoplastic elastomer is a polymer group of one or any mixture of styrene-butadiene-styrene block copolymer (SBS), styrene-isoprene-styrene block copolymer (SIS), and styrenic block copolymer (SBC) with a weight percentage of 10-80%, and wherein the second thermoplastic elastomer is a polymer group of one or any mixture of polystyrene (PS), acrylonitrile-styrene copolymer (AS), acrylonitrile-butadiene-styrene (ABS), and high-impact polystyrene (HIPS) with a weight percentage of 10-80%.

9. The emulated wood as claimed in claim 7, wherein the foaming agent is an azo-based chemical foaming agent or a baking soda physical foaming agent with a weight percentage of 0.1-15.0%, and wherein the crosslinking agent is dicumyl peroxide, 2,5-(tert-butylperoxide)-2,5-dimethylhexane, or sulfur with a weight percentage of 0.01-2.0%.

10. The emulated wood as claimed in claim 8, wherein the foaming agent is an azo-based chemical foaming agent or a baking soda physical foaming agent with a weight percentage of 0.1-15.0%, and wherein the crosslinking agent is dicumyl peroxide, 2,5-(tert-butylperoxide)-2,5-dimethylhexane, or sulfur with a weight percentage of 0.01-2.0%.

11. The emulated wood as claimed in claim 9, wherein the plurality of synthetic fibers (13) is glass fibers or carbon fibers.

12. The emulated wood as claimed in claim 10, wherein the plurality of synthetic fibers (13) is glass fibers or carbon fibers.

13. The emulated wood as claimed in claim 1, wherein the two sheets (11, 12) further comprise foaming promotors, dyes, or fire retardants.

* * * * *